United States Patent [19]  
Ahmad

[11] 3,966,606  
[45] June 29, 1976

[54] FILTER IN SAMPLE DRAWING DEVICE
[75] Inventor: Mohammad Ahmad, Ipswich, England
[73] Assignee: Fisons Limited, London, England
[22] Filed: Feb. 5, 1975
[21] Appl. No.: 547,354
[30] Foreign Application Priority Data
Feb. 6, 1974 United Kingdom.........5407/74
[52] U.S. Cl............................... 210/136; 210/411; 210/449; 210/459
[51] Int. Cl.²........................................ B01D 35/00
[58] Field of Search...................... 23/230 A, 253 A; 73/425.2, 425.4 R; 210/117, 136, 411, 449, 459
[56] References Cited
UNITED STATES PATENTS
3,193,103  7/1965  Snyder............................... 210/411
3,712,795  1/1973  Hamshere et al................. 23/253 A Primary Examiner—Charles N. Hart
Assistant Examiner—Richard W. Burks
Attorney, Agent, or Firm—Wenderoth, Lind & Ponack

[57] ABSTRACT

The present invention relates to a double leaf filter head for drawing clear samples from a liquid to be analysed. The filter head is of especial use in drawing samples of phoshoric acid whose $SO_4^{--}$ ion content is to be analysed by turbidimetric methods.

8 Claims, 3 Drawing Figures

FILTER IN SAMPLE DRAWING DEVICE

The present invention relates to a filtration device and to its use.

In the production of phosphoric acid by the reaction of phosphate rock with sulphuric acid, it is important for a variety of reasons to maintain the sulphate ion levels during the process and in the product acid within given ranges. To do this, samples of the reaction mixture and the product acid are withdrawn and the sulphate ion determined, usually by treatment with barium followed by assessment of the amount of barium sulphate formed, e.g. by turbidimetric methods. However, the samples will contain solid particles, e.g. of undigested rock and calcium sulphate crystals. These solids interfere with the determination of the sulphate ion levels and must be removed before analysis takes place. Whilst various methods have been proposed for removing the solids, these have been cumbersome, difficult to operate or only partially successful.

We have now devised a filtration device which overcomes many of the problems of earlier proposals. For convenience the device will be described with respect to a preferred embodiment thereof and its use will be described in relation to sulphate analysis in phosphoric acid. However, it will be appreciated that the device finds use in many other situations where it is desired to remove solids from liquids, e.g. sampling liquid effluents.

Figure 1:
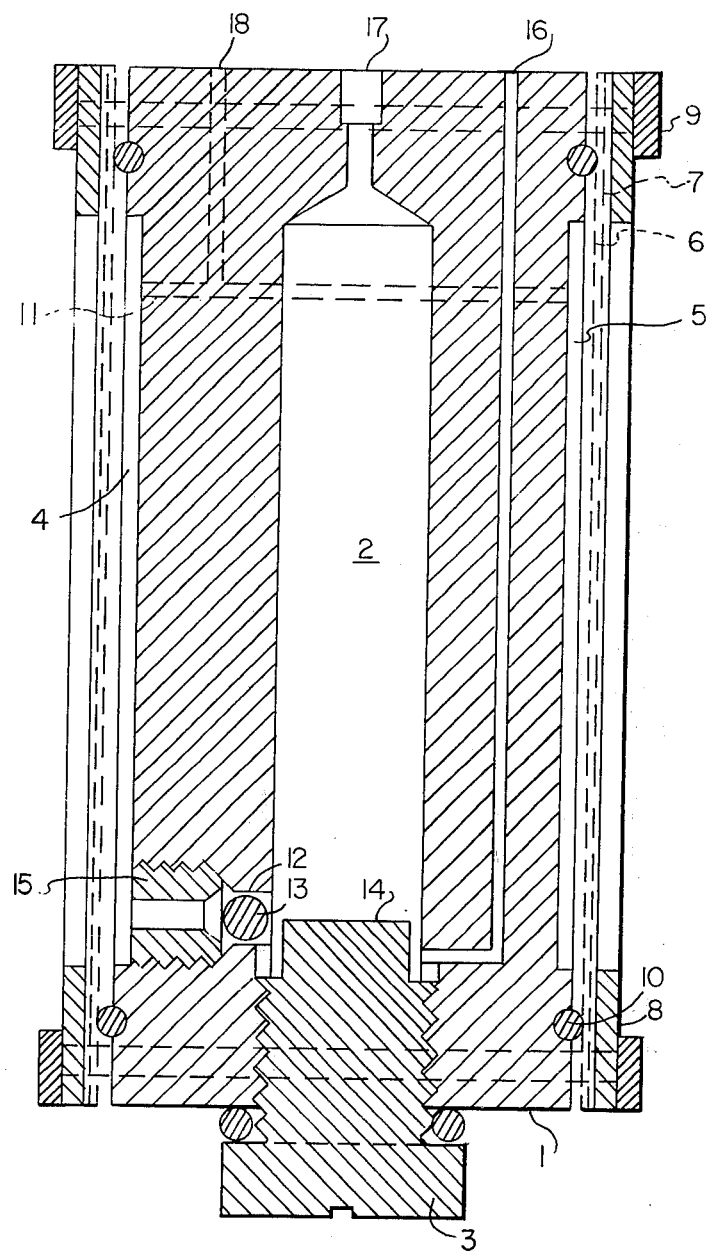
Figure 2:
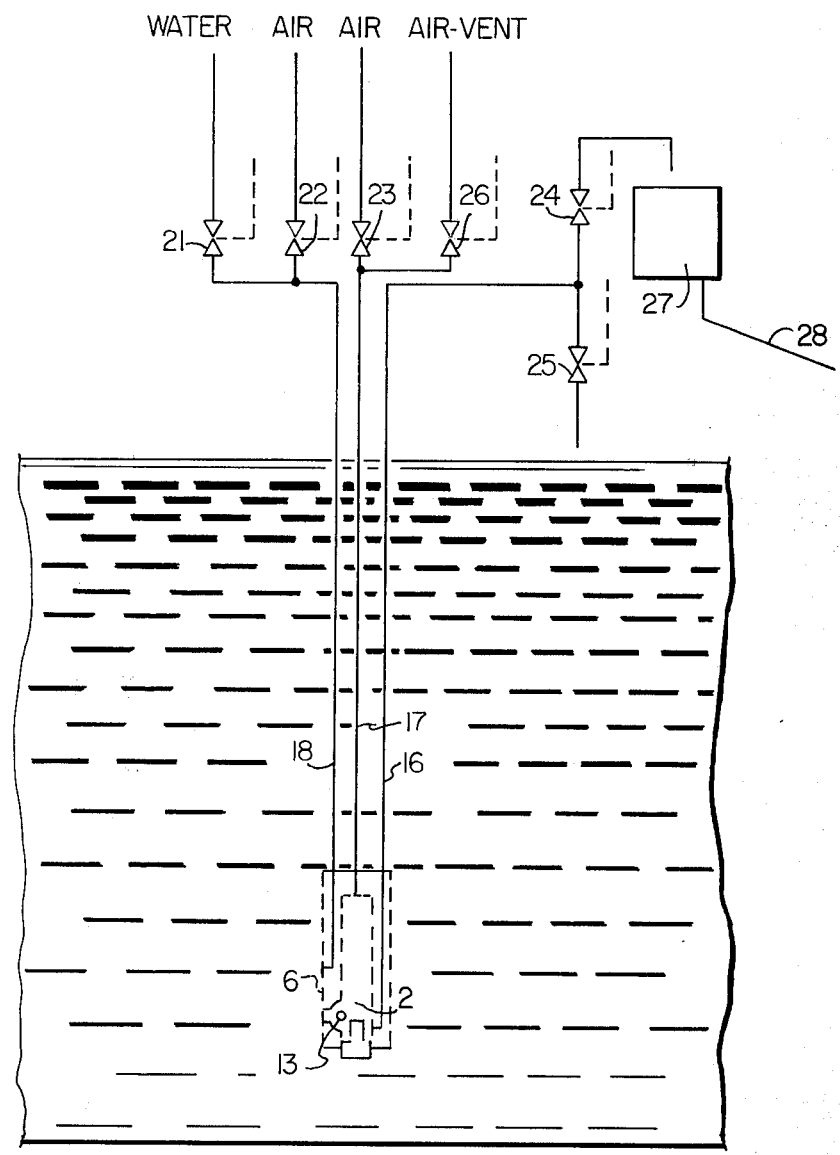
Figure 3:
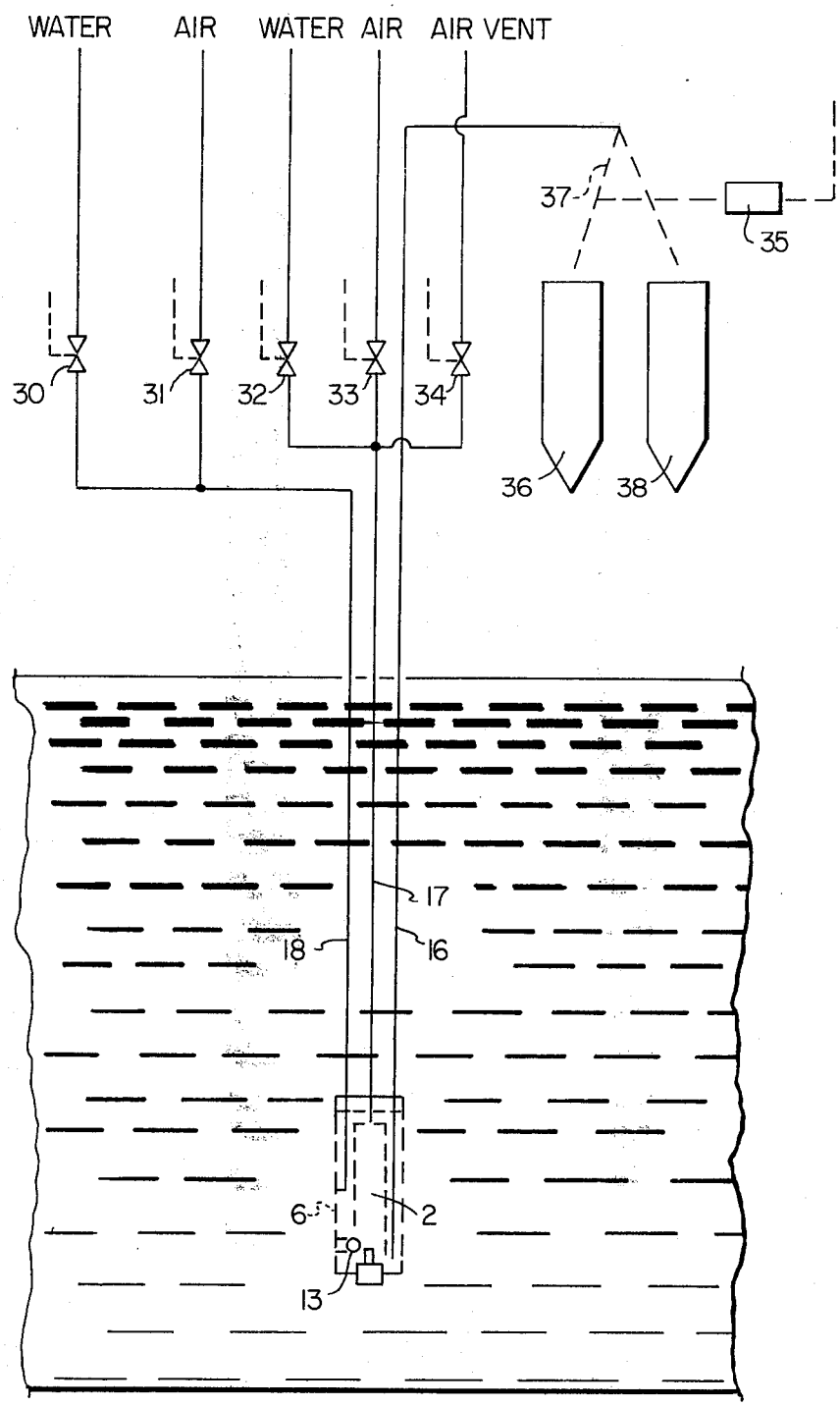

As indicated above the device of the invention will be described by way of illustration with respect to the preferred form shown in the accompanying drawings, in which FIG. 1 is a vertical section through the device;

FIG. 2 is a schematic layout of the device and associated pipework when in use; and FIG. 3 is an alternative layout to that shown in FIG. 2.

The device comprises a block 1 of a suitable acid-resistant material, such as polypropylene or some other synthetic resin. This block is drilled out to form an internal filtrate storage chamber 2 whose open end is closed with the screwthreaded stopper 3. Two opposite faces of the block are recessed to form the open filtrate reception chambers 4 and 5. Across the open faces of chambers 4 and 5 are mounted the filtration media 6 and 7. The media may be sheets of reticulate material, e.g. polypropylene filter cloth, or sheets of a porous or foraminous material, e.g. sheets of sintered glass or ceramic filter media. The media 6 and 7 are each held in place by a clamping frame 8 and bolts 9 and sealing ring 10 is used to form a water tight seal between the perimeter of the media and the faces of block 1.

The block 1 is drilled out with bore 11 which connects chamber 5 with chamber 4. If desired, there may be more than one such bore 11. Chamber 2 is connected with either or both of chambers 4 and 5 by means of a bore 12 incorporating a one way valve. This valve may take a number of forms, but is preferably a ball valve consisting of a PTFE ball 13 loosely fitted into bore 12. Stopper 3 projects across the mouth of the bore 12 into chamber 2 and this projection 14 acts as a stop to prevent ball 13 escaping from bore 12 into chamber 2. The other, outer, end of bore 12 discharging into, in the case shown in FIG. 1, chamber 4 has a restricting insert 15 therein. The insert 15 acts as a stop to prevent ball 13 escaping from bore 12 and is dished on its inner face to provide a concave face against which the ball 13 seals when the ball is urged towards chamber 4. Insert 15 is preferably removable, e.g. by being a screw fit into bore 12, to permit cleaning of bore 12 and ball 13.

The block 1 is drilled with a bore 16 leading from the base, stoppered end, of chamber 2 to the upper surface of block 1; with a bore 17 leading from the upper end of chamber 2 to the upper surface of block 1; and with bore 18 leading from bore 11 to the upper surface of block 1.

In use the outlets of bores 16, 17 and 18 in the upper surface of block 1 are connected to sources of compressed air and water (not shown) as shown in FIG. 2. The air and water lines are provided with solenoid valves 21, 22, 23 and 26 and pneumatically operated pinch valves 24 and 25 actuated by a time elapse control device (not shown). The block 1 is then totally submerged in the liquid to be sampled, e.g. to a depth of 10 to 200 cms in wet process phosphoric acid. At this point valves 21, 25 and 26 are opened. Water washes through the device and is passed to waste through valve 25. Valve 21 closes and valve 23 opens permitting air to enter chamber 2. The air pressure closes the one way ball valve in bore 12 and purges any water from chamber 2 and bore 18 through valve 25 to waste. Valve 25 then closes and valve 21 opens to permit water to wash the filter media 6 and 7 and chambers 4 and 5. Since the air pressure in chamber 2 is higher than the water pressure entering via valve 21 or the air pressure via valve 22, the ball valve in bore 12 remains closed. Valve 21 closes and water is purged from chambers 4 and 5 and filter media 6 and 7 by opening air valve 22. Air valves 22 and 23 are then closed and vent valve 26 opens. By virtue of the hydrostatic head, liquid passes through the filter media and enters chamber 2. Vent valve 26 is then closed and the filtrate blown through valve 25 to waste by opening air valve 23 (which also closes the ball valve in bore 12). The device has now been washed out first with water to remove traces of earlier samples and then with first runnings of the filtrate to reduce the dilution effect of any water present.

The filtration proper then begins by opening valve 26 and allowing filtrate to flow into chamber 2 for sufficient time to fill chamber 2 (e.g. 2–5 minutes). Valves 25 and 26 are then closed and valves 23 and 24 opened to blow the sample into the sample receiver 27. Excess sample may be discharged by over flow pipe 28, from receiver 27.

The filtration device shown in FIG. 1 may be operated in a modified manner using the air and water connections shown in FIG. 3. In this instance the outlets of bores 16, 17 and 18 are connected as shown in FIG. 3 to sources of compressed air and water (not shown).

The air and water lines are provided with solenoid valves 30, 31, 32, 33, air vent valve 34 and pneumatically operated sample discharge position valve 35, actuated by a time elapse control device (not shown). The block 1 is then totally submerged in the liquid to be sampled, e.g. to a depth of 10 to 200 cms in wet process phosphoric acid. At this point valves 30 and 32 are opened and valve 35 positions the discharge pipe to vessel 36. Water back washes the filter cloth and the filter cavity and discharges through 36. Valves 30 and 32 close and air valves 31 and 33 open permitting air to enter chamber 2 and, through bore 18, behind the filter media. The air pressure closes the one way ball valve in bore 12 and purges any water from chamber 2 and through vessel 36, and cavities 4 and 5 through filter media 6 and 7. Since the air supply pressure to bore 17 is higher than to bore 18, the ball valve in bore 12 remains closed. Air valves 31 and 33 are then closed and vent valve 34 opens.

By virtue of the hydrostatic head, acid passes through the filter media and enters chamber 2.

Vent valve 34 is then closed and air valve 33 opened. The filtrate is blown through 36 to acid tank thus purging any water which may have been left in the system in the previous wash cycle.

Air valve 33 is closed and vent valve 34 opens again to allow filtration of acid into chamber 2. Vent valve 34 closes and air valve 33 opens to purge the second pre-sample acid through vessel 36. The device has now been washed out first with water to remove traces of earlier samples and then with runnings of the filtrate to reduce the dilution effect of any water present.

The filtration proper then begins by opening valve 34 and closing valve 33 allowing filtrate to flow into chamber 2 for sufficient time to fill chamber 2 (e.g. 2–5 minutes). Valve 34 is then closed and discharge pipe 37 moved to sample receiver 38 by valve 35. Air valve 33 then opens and discharges sample acid into sample receiver 38.

After ejection of the sample, the above cycle is repeated, the early washing and purging stages removing filter cake and remaining filtrate on and in the filter media and the device.

The sample collected in receiver 27 or 38 may then be analysed in any suitable manner. We have found that the device of the invention enables samples which are substantially free from suspended particles to be obtained and hence that the samples are suitable for use in turbidimetric analytical techniques. Thus, the device of the invention is of especial use in the determination of $SO_4^{--}$ ion levels in wet process phosphoric acid.

Accordingly, the present invention also provides a method for sampling phosphoric acid wherein the sample is collected using a device of the invention.

As indicated above, the device described above may be altered in various ways. Thus, the block 1 need not be rectangular in shape but could be of rounded or other shape; the filter media and chambers 4 and 5 need not be two in number, but could be more than this, and need not be on opposed faces. Thus, for example, the device could be of generally cubical shape with filter surfaces on five faces; or the device could be of cylindrical shape with curved, as opposed to flat, filter surfaces.

Thus, in general terms the device of the invention may be described as comprising a housing containing a closed filtrate storage chamber, the external surfaces of the housing being provided with at least two open faced filtrate reception chambers, the open faces of said chambers being closed with a filtration medium; the storage chamber being connected to one of the reception chambers by means of a passage incorporating a one way valve; the reception chambers being connected either directly or indirectly with one another by means of passages within the housing; the housing being provided with further passages whereby fluid may be fed to or removed from the reception chambers and the storage chamber independently from or to a plurality of external sources.

I claim:

1. A filtration device comprising a housing containing a closed filtrate storage chamber, the external surfaces of the housing being provided with at least two open faced filtrate reception chambers, the open faces of said chambers being closed with a filtration medium; the storage chamber being connected to one of the reception chambers by means of a passage incorporating a one way valve; the reception chambers being in liquid flow connection with one another by means of passages within the housing; the housing being provided with further passages whereby fluid may be fed to or removed from the reception chambers and the storage chamber independently from or to a plurality of external sources.

2. A device as claimed in claim 1 wherein the filtration medium closing the open faces of the filtrate reception chambers is selected from sheets of reticulate, foraminous and porous materials.

3. A device as claimed in claim 1 wherein the housing is a block of a synthetic resin.

4. A device as claimed in claim 1 wherein the housing has rectangular faces and has the filtrate reception chambers provided on the opposite rectangular faces thereof.

5. A device as claimed in claim 1 wherein sources of water and/or compressed air are connected via valving means to one or both of the filtration reception chambers; wherein sources of water and and/or compressed air and a venting arrangement are connected by valving means to the sample storage chamber; and wherein the sample storage chamber is connected via valving means to a sample receiving vessel.

6. A device as claimed in claim 5 wherein the valving means are operated in a controlled timed sequence by means of a programmed operating control mechanism.

7. A filtration device comprising a rectangular block of an acid resistant synthetic resin the interior of the block being cut away to form an internal filtrate storage chamber, two opposed rectangular faces of the block being recessed to provide two open faced filtrate reception chambers, one of the filtrate reception chambers being in fluid flow connection with the filtrate storage chamber by means of a passage within the block incorporating a one way valve and both filtrate reception chambers being in fluid flow connection with one another by means of passages within the block; a sheet of filtration medium being mounted upon each of the said two elongated faces of the block so as to close the open faces of the filtration reception chambers; and there being further passages within the block whereby external sources of fluid may be connected independently to the filtrate reception and storage chambers.

8. A filtration device as claimed in claim 1 provided with an analytical device.

* * * * *